dry mixtures col. 3

United States Patent Office 3,333,973
Patented Aug. 1, 1967

3,333,973
ALKALI METAL SILICATE COATING COMPOSITIONS
Aaron Freiman, Brooklyn, N.Y., assignor, by mesne assignments, to Celanese Coatings Company, a corporation of Delaware
No Drawing. Filed May 5, 1964, Ser. No. 365,193
7 Claims. (Cl. 106—84)

This invention generally relates to inorganic protective coating compositions for metals. The invention pertains particularly to inorganic coatings of the zinc-silicate type. More particularly, this invention pertains to inorganic zinc-silicate coating compositions that require no post-treatment of the coating to effect a cure.

Coating compositions made from a mixture of zinc metal powder and an alkali metal silicate are well-known compositions that have been found to be quite useful for protecting metals from the weather and from sea water. Coating compositions of the zinc-silicate type have been extensively used in the marine field and by the oil industry, since the corrosion of iron and steel which is periodically exposed to salt water presents a very serious problem.

In utilizing these inorganic coating systems, finely divided zinc metal is dispersed in an aqueous alkali metal silicate solution just prior to application since the system is not chemically stable for any great length of time. After mixing, the zinc-alkali metal silicate dispersion is applied to the metal surface by any conventional means, such as spraying, brushing, troweling, and the like. The curing rate of the untreated zinc-silicate coatings is very slow requiring weeks and even months in order to reach a state of insolubility that will not be affected by water and the weather. The curing reaction is speeded up conventionally by applying a curing solution to the film surface. The curing solution, which can be an aqueous solution of a salt or an acid, must remain in contact with the film for a considerable length of time, usually a day or two, in order for an adequate cure to be obtained. The disadvantages of using such curing solutions lie not only in the problem of applying the solution to the surface, but also in that the rate of cure throughout the coating is not uniform. The cure takes place at the surface first and then progresses through the coating. As the surface cures, further penetration of the curing agent into the film is inhibited, thus preventing a thorough cure.

This invention relates to the preparation of zinc-silicate compositions that require no post treatment with a curing solution to obtain a cured insoluble coating. The invention contemplates the addition to a zinc-alkali metal silicate coating composition of a compound which hydrolyzes in the presence of alkali solutions of silicates to an acid thus rendering the silicate insoluble. By this invention, zinc-silicate coating compositions are obtained which are stable before application for at least sixteen hours, but yet cure within a reasonable length of time after application to the metal surface without the necessity of using a curing solution.

In accordance with this invention, zinc-silicate coating compositions having the specified properties are obtained by the incorporation of an indurating compound in the zinc metal-alkali metal silicate mixture. Such indurating compounds are acid amides having a low degree of solubility in water. Particularly useful acid amides are those which are solid at ambient temperatures and have a solubility in water of less than about 1 percent by weight at 15° C. Self-curing one coat zinc-alkali metal silicate coating compositions are thus obtained from an aqueous solution of an alkali metal silicate in admixture with comminuted zinc metal and a finely divided acid amide which is solid at ambient temperature and has a solubility in water of less than about 1 percent by weight at 15° C. Acid amides having melting points above about 50° C. are preferred.

The alkali metal silicates which can be used according to this invention are the sodium and potassium silicates or mixtures thereof. The compositions of such silicates are generally expressed as the ratio of alkali metal oxide to silicon dioxide. For instance, commercial sodium silicate, which is known as water glass, has a ratio of $SiO_2$ to $Na_2O$ between 2 and 4 and is available in 30 percent to 55 percent solutions by weight in water. Examples of sodium silicates which have been found useful in this invention are such aqueous solutions having ratios of $Na_2O:SiO_2$ of between about 1:2.50 and 1:3.75. The preferred sodium silicates are those containing lower amounts of alkali, since better initial durability properties are generally obtained. These preferred compositions have the ratios of $Na_2O:SiO_2$ of 1:3.00 to 1:3.75. However, this invention is not limited to these ratios since excellent protective coatings can be prepared from sodium silicates over the whole range of ratios so long as there is sufficient alkalinity present to promote the curing reaction. Potassium silicate solutions have also found utility in this invention, the preferred compositions being expressed as $K_2O:SiO_2$ of between about 1:2 and 1:2.5 dissolved at 30 percent to 55 percent weight concentration in water.

The metallic zinc employed in the compositions of this invention is finely divided or powdered zinc commonly referred to as zinc dust. Such comminuted zinc metal is ordinarily used in the proportions of between about 5 and 25 parts of zinc by weight to 1 part of sodium silicate or potassium silicate on solids basis but obviously different proportions can be used depending upon the end properties desired.

Certain bivalent metal salts can be added to the composition of this invention to improve somewhat the cure of the films. Such bivalent metal salts are red lead ($Pb_3O_4$), zinc sulfide and the peroxides of calcium, magnesium and zinc, and can be used in amounts up to about 20 parts by weight per 100 parts of zinc metal. However, incorporation of such salts is not necessary for the operation of this invention, since well-cured coatings are obtained without them.

Examples, in some detail, of alkali metal silicates, zinc metal and the proportions of each that can be used in order to obtain advantageous protective coatings that utilize the galvanic action of the zinc are dealt with in such U.S. Patents as 2,673,817 and 2,944,919. The subject matter of these patents is hereby made a part of this specification.

The acid amides useful in this invention are solid at ambient temperatures and are substantially water insoluble. Examples of such amides include oxamide, succinamide, and adipamide. The addition to the zinc-silicate solutions of substantially water insoluble acid amides in an amount sufficient to cure the zinc-silicate mixture results in protective coatings with excellent durability and resistance properties within twenty-four hours after application, even though the amide is, for all practical purposes, insoluble in the aqueous zinc-silicate system. Even in view of this rapid cure of the film, the zinc-silicate compositions have a workable pot life, before application, of at least sixteen hours. The low solubility of the amide in the aqueous system and the hydrolysis of the amide to the acid probably accounts for these properties of lengthy stability before use and rapid cure after application. This hydrolysis to the acid effectively catalyzes the coreaction of the zinc and the silicate producing the cured films.

The amount of indurating amide employed to cure the zinc-silicate compositions can be varied quite widely and is thus not critical. A sufficient amount of the amide should be used in the zinc-silicate compositions to obtain a rate of reaction or curing speed desired under the particular circumstances of use. The most advantageous amount of amide which should be used can readily be determined by those skilled in the art and will depend on a number of variables such as the alkalinity of the aqueous metal silicate, the amount of zinc present, the temperature of application and cure, and so forth. Generally, it has been found that the use of at least about 12 parts by weight of an amide per 100 parts by weight of the alkali metal silicate produces an advantageous rate of reaction or cure. Lower amounts of amide can of course be used but the rate of cure gradually decreases as the amount of amide is decreased in an otherwise constant system. Higher amounts of amide can also be used but it has been found that amounts in excess of about 12 parts by weight per 100 parts by weight of alkali metal silicate do not appreciably affect the rate of reaction or cure as well as the potlife of the system. Therefore, the maximum amount of amide which can be used is controlled by economic considerations. Economics today will generally require as a practical matter that less than about 60 parts by weight of amide be used per 100 parts by weight of alkali silicate.

As has been hereinbefore stated, zinc-silicate coating compositions are two-package systems due to the reactivity of the zinc in the silicate solution. The indurating acid amides of this invention lend themselves well to such a system. The amide can be blended readily with the comminuted zinc in one package thereby retaining a two-package system. This dry mix of zinc metal and amide is then blended with an aqueous alkali metal silicate solution contained in a separate package just prior to use. Alkali metal silicates can also be obtained as dry powders. The dry powdered alkali metal silicate, the amide and the comminuted zinc can be blended in one package and just prior to use, the dry blend can be mixed with water. The zinc and amide can also be separately packaged and blended with the silicate solution just prior to use. These and other such variations as will occur to those skilled in the art are within the contemplation of this invention.

The following examples serve to illustrate the invention but they are not intended to limit it thereto. Parts, where used in these examples, are parts by weight.

Example 1

In a suitable container were mixed 111 parts of aqueous sodium silicate solution (6.75 weight percent $Na_2O$, 25.3 weight percent $SiO_2$), 111 parts of water, 1 part of potassium dichromate and 1 part of a sulfonated castor oil wetting agent. In a second container were dry blended 735 parts of zinc dust, 32 parts of finely divided zinc sulfide, and 9 parts of powdered oxamide. The dry blend of the second container was added with stirring to the contents of the first container and 4 mil films were prepared on mild steel panels, sandblasted to a white metal, by spray application. The coated panels were allowed to dry for one week and then were immersed in synthetic sea water and gasoline. No film failures or corrosion were observed after one year in these tests. No failures were observed in the film after subjection for one year to sea water cycle tests carried out in accordance with Navy Specification MIL-P-23236 Ships, June 28, 1962.

Example 2

In a suitable container were mixed 45 parts of aqueous sodium silicate solution (8.2 weight percent $Na_2O$, 26.4 weight percent $SiO_2$), 41 parts of aqueous potassium silicate solution, (12.45 weight percent $K_2O$ and 26.2 weight percent $SiO_2$), 139 parts of water, 1 part of potassium dichromate and 1 part of a sulfonated castor oil wetting agent. In a second container were dry blended 716 parts of zinc dust, 24 parts of zinc sulfide, 24 parts of chrome oxide, and 9 parts of oxamide. The dry blend of the second container was added with stirring to the contents of the first container and 4 mil films were prepared on mild steel panels, sandblasted to white metal, by spray application. Coated panels were allowed to dry for one week and then they were immersed in synthetic sea water and gasoline. No failure occurred in the films or corrosion was observed after 6 months in these tests. No failure occurred in the films after subjugation for 6 months to sea water cycle tests carried out in accordance with Navy Specification MIL-P-23236 Ships, June 28, 1962.

Example 3

To a suitable container were added 112 parts of an aqueous sodium-silicate solution (6.75 weight percent $Na_2O$ and 25.3 weight percent $SiO_2$), 111 parts of water and 1 part of a sulfonated castor oil wetting agent. Zinc dust, 735 parts, red lead, 32 parts, and oxamide, 9 parts, were dry blended and were added to the aqueous silicate solution with stirring. 4 mil films were prepared on clean steel panels and were allowed to dry for 1 week. These panels were immersed in synthetic sea water and gasoline and were subjected to the sea water cycle test carried out in accordance with Navy Specification MIL-P-23236 Ship, June 28, 1962. The films were in perfect condition after one year in these tests.

Example 4

To a suitable container were added 101 parts of aqueous sodium silicate solution (8.2 weight percent $Na_2O$ and 26.4 weight percent $SiO_2$), 140 parts of water and 1 part of a sulfonated castor oil wetting agent. In a second container were blended 743 parts of zinc dust and 15 parts of oxamide. 4 mil films were prepared on clean steel panels and were allowed to dry for one week. These coated panels were immersed in synthetic sea water for one year without failure.

Example 5

A coating composition was prepared exactly as described in Example 4 except no oxamide was used. Coatings were prepared from this composition as described in Example 4 on steel panels. After drying for one week, the coated panels were immersed in synthetic sea water. Complete failure of the coatings occurred within one week.

Example 6

In a suitable container were mixed 45 parts of aqueous sodium silicate solution (8.2 weight percent $Na_2O$, 26.4 weight percent $SiO_2$), 41 parts of aqueous potassium silicate solution (12.45 weight percent $K_2O$ and 26.2 weight percent $SiO_2$), 139 parts of water, 1 part of potassium dichromate and 1 part of a sulfonated castor oil wetting agent. In a second container were dry blended 716 parts of zinc dust, 24 parts of zinc sulfide, 24 parts of chrome oxide, and 9 parts of adipamide. The dry blend of the second container was added with stirring to the contents of the first container and 4 mil films were prepared on mild steel panels, sandblasted to white metal, by spray application. Coated panels were allowed to dry for one week and then they were immersed in synthetic sea water and gasoline. No failure occurred in the films or corrosion was observed after 6 months in these tests. No failure occurred in the films after subjugation for 6 months to the sea water cycle test carried out in accordance with Navy Specification MIL-P-23236 Ships, June 28, 1962.

Example 7

In a suitable container were mixed 45 parts of aqueous sodium silicate solution (8.2 weight percent $Na_2O$, 26.4 weight percent $SiO_2$), 41 parts of aqueous potassium silicate solution (12.45 weight percent $K_2O$ and 26.2 weight percent $SiO_2$), 139 parts of water, 1 part of potassium dichromate and 1 part of a sulfonated castor oil wetting agent. In a second container were dry blended 716 parts of zinc dust, 24 parts of zinc sulfide, 24 parts of chrome oxide, and 9 parts of succinamide. The dry blend of the second container was added with stirring to the contents of the first container and 4 mil films were prepared on mild steel panels, sandblasted to white metal, by spray application. Coated panels were allowed to dry for one week and then they were immersed in synthetic sea water and gasoline. No failure occurred in the films or corrosion was observed after 6 months in these tests. No failure occurred in the films after subjugation for 6 months to the sea water cycle test carried out in accordance with Navy Specification MIL-P-23236 Ships, June 28, 1962.

The coating compositions of this invention produced according to the above examples remained in a fluid workable condition sixteen hours after mixing. Films were prepared from these compositions at different times throughout the workable potlife of the compositions. No differences in stability and durability are observed in any of these films, whether prepared immediately or 16 hours after mixing.

As can be seen from the foregoing examples, protective coating compositions are prepared by this invention which cure to durable protective films without post treating with an indurating solution.

I claim:
1. An aqueous alkali metal silicate coating composition containing comminuted zinc and having a pot life of at least 16 hours comprising:
   (a) an aqueous solution of sodium silicate, potassium silicate or mixtures thereof, wherein the ratio of $Na_2O$ to $SiO_2$ in the sodium silicate is between about 1:2.5 and 1:3.75 and the ratio of $K_2O$ to $SiO_2$ in the potassium silicate is between about 1:2 and 1:2.5;
   (b) comminuted zinc metal in the amount of about 5 to 25 parts by weight of zinc to 1 part by weight of alkali metal silicate; and
   (c) as an indurating agent an acid amide selected from the group consisting of oxamide, succinamide and adipamide, said amide being present in an amount sufficient on hydrolysis to render the composition insoluble.

2. The composition of claim 1 in which the acid amide is oxamide.

3. The composition of claim 1 in which the acid amide is succinamide.

4. The composition of claim 1 in which the acid amide is adipamide.

5. An alkali metal silicate coating composition having a pot life of at least 16 hours comprising:
   (a) an aqueous solution of sodium silicate, potassium silicate or mixtures thereof, wherein the ratio of $Na_2O$ to $SiO_2$ in the sodium silicate is between about 1:2.5 and 1:3.75 and the ratio of $K_2O$ to $SiO_2$ in the potassium silicate is between about 1:2 and 1:2.5;
   (b) comminuted zinc metal in the amount of about 5 to 25 parts by weight of zinc to 1 part by weight of alkali metal silicate; and
   (c) as an indurating agent a finely divided acid amide selected from the group consisting of oxamide, succinamide and adipamide in an amount of about 12 to 60 parts by weight of amide per 100 parts by weight of alkali metal silicate.

6. In a two package alkali metal silicate coating composition which on mixing has a pot life of at least 16 hours
   (a) in one package an aqueous solution of sodium silicate, potassium silicate or mixtures thereof, wherein the ratio of $Na_2O$ to $SiO_2$ in the sodium silicate is between about 1:2.5 and 1:3.75 and the ratio of $K_2O$ to $SiO_2$ in the potassium silicate is between about 1:2 and 1:2.5;
   (b) in the other package comminuted zinc metal in the amount of about 5 to 25 parts by weight of zinc based on 1 part by weight of alkali metal silicate and a finely divided acid amide selected from the group consisting of oxamide, succinamide and adipamide in an amount of about 12 to 60 parts by weight of amide based on 100 parts by weight of alkali metal silicate.

7. A process of protecting metallic surfaces from corrosion which comprises
   (A) applying to the surface to be protected a coating composition having a pot life of at least 16 hours
      (a) an aqueous solution of sodium silicate, potassium silicate or mixtures thereof, wherein the ratio of $Na_2O$ to $SiO_2$ in the sodium silicate is between about 1:2.5 and 1:3.75 and the ratio of $K_2O$ to $SiO_2$ in the potassium silicate is between about 1:2 and 1:2.5;
      (b) comminuted zinc metal in the amount of about 5 to 25 parts by weight of zinc to 1 part by weight of alkali metal silicate; and
      (c) an acid amide selected from the group consisting of oxamide, succinamide and adipamide in an amount of about 12 to 60 parts by weight of amide per 100 parts by weight of alkali metal silicate, and
   (B) permitting the composition to cure to the insoluble state.

References Cited

UNITED STATES PATENTS

| | | | |
|---|---|---|---|
| 2,311,272 | 2/1943 | Ware | 106—84 X |
| 2,509,875 | 5/1950 | McDonald | 106—84 |
| 2,766,130 | 9/1956 | Dietz | 106—74 |
| 3,093,493 | 6/1963 | Freyhold | 106—74 X |

FOREIGN PATENTS 639,257 4/1962 Canada.

TOBIAS E. LEVOW, *Primary Examiner.*

S. E. MOTT, *Assistant Examiner.*